Dec. 10, 1968   R. C. CARSON   3,415,144
DISTANCE GOVERNOR
Filed Feb. 27, 1967   3 Sheets-Sheet 1

INVENTOR
ROBERT C. CARSON
BY
Bernard J. Brown
ATTORNEY

Dec. 10, 1968  R. C. CARSON  3,415,144
DISTANCE GOVERNOR
Filed Feb. 27, 1967  3 Sheets-Sheet 2

INVENTOR
ROBERT C. CARSON
BY

ATTORNEY

Dec. 10, 1968   R. C. CARSON   3,415,144
DISTANCE GOVERNOR

Filed Feb. 27, 1967   3 Sheets-Sheet 3

INVENTOR
ROBERT C. CARSON
BY
ATTORNEY

United States Patent Office 3,415,144
Patented Dec. 10, 1968

3,415,144
DISTANCE GOVERNOR
Robert C. Carson, 15809 Loukelton St.,
La Puente, Calif. 91744
Filed Feb. 27, 1967, Ser. No. 618,723
8 Claims. (Cl. 74—640)

ABSTRACT OF THE DISCLOSURE

A mechanical revolution counter for various applications, including automatic braking of a shopping cart wheel and measuring fluid flow, having a pair of driven members which are driven in relative axial movement in response to relative rotation of a pair of rotary driving members and through a distance which is proportional to the number of relative revolutions of the driving members.

---

This invention relates generally to mechanical counters. More particularly, the invention relates to a novel mechanical revolution counter, as well as to an automatic shopping cart wheel brake and a flow meter embodying the counter.

In its broader aspects, the invention provides a mechanical revolution counter having a pair of relatively rotatable driving members, a pair of relatively rotatable and axially movable driven members, rotary driving means connecting the driving and driven members respectively, in such a way that relative rotation of the driving members drives the driven members in relative rotation, and axial driving means connecting the driven members in such a way that relative rotation of the driven members drives these members in relative axial movement through a distance which is proportional to the number of relative revolutions of the driving members. Accordingly, a given number of relative revolutions of the driving members produces a corresponding relative axial travel of the driven members. The relative axial travel of the driven members, therefore, may be utilized as a counting function for counting, in effect, the relative revolutions of the driving members.

According to one feature of the invention, the rotary driving means of the revolution counter embodies speed reducing means for effecting relative rotation of the driven members at a substantially lower relative angular velocity than that of the driving members. The axial driving means embodies a motion reducing and translating means which is effective to impart a relatively small but proportional relative axial travel to the driven members in response to a relatively large number of relative revolutions of the driven members. This feature of the invention results in a revolution counter of minimum size and maximum revolution counting capacity. According to another feature of the invention, the counter is equipped with means for selectively inactivating the axial driving means of the counter to permit relative rotation of the driving members without imparting relative axial movement to the driven members. This feature, then, permits selective activation and inactivation of the revolution counting function of the counter.

As will appear from the ensuing description, the present revolution counter may be employed for a variety of applications. Only two of these many applications are disclosed herein. One disclosed application involves the use of the counter as an automatic brake mechanism for one wheel of a market shopping cart. In this application, one driving member of the counter forms the cart wheel and the other driving member forms a wheel support which is adapted for attachment to the shopping cart frame. The brake mechanism includes brake means which are operated by relative axial movement of the driven members to lock the wheel against rotation in response to a predetermined distance of travel of the shopping cart along the ground. The brake mechanism is adjustable to vary the shopping cart travel required to apply the brake. The brake mechanism is designed to be released and inactivated only by authorized persons. In this application, the present revolution counter effectively utilizes a digital revolution counting function. The other disclosed application of the invention involves use of the revolution counter as a fluid flow sensor or meter. In this application, one driving member of the counter forms a vane impulse rotor to be driven in rotation by a fluid stream within a conduit and the other driving member forms a rotor support. The relative axial travel of the driven members occasioned by rotation of the rotor in response to fluid flow is utilized to effect a flow indicating or measuring function which may be either digital or analog in character.

It is a general object of the invention, therefore, to provide a novel mechanical revolution counter of the character described.

Another object of the invention is to provide an automatic wheel brake for market shopping carts and a fluid flow sensor or meter which embody the revolution counter.

A further object of the invention is to provide a mechanical revolution counter, as well as an automatic shopping cart wheel brake and a fluid flow meter embodying the counter, which are relatively simple in construction, economical to manufacture, reliable in operation, rugged, and otherwise ideally suited to their intended purposes.

Other objects, features and advantages of the present invention will become apparent to those versed in the art from a consideration of the following description, the appended claims and the accompanying drawings, wherein:

Figure 1:
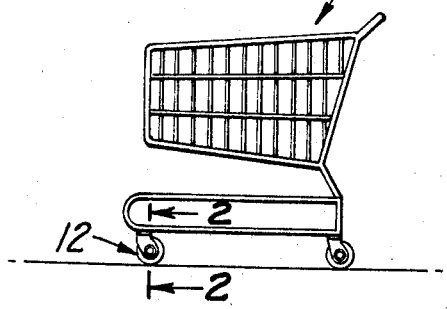
FIGURE 1 is a side elevation of a market shopping cart having a wheel assembly including an automatic wheel brake according to the invention.

Referring first to FIGURES 1 through 7 of the drawings, there is illustrated a market shopping cart 10 having a front wheel assembly 12 including a revolution counter 14 according to the invention. In general terms, this revolution counter comprises a pair of rotary driving members 16 and 18 mutually supported for relative rotation on an axis 20, a pair of driven members 22 and 24 supported on the driving members 16 and 18, respectively, for relative rotation on and relative axial movement along the axis 20, rotary driving means 26 connecting the driving and driven members, respectively, for relative rotation of the driven members in response to relative rotation of the driving members, and axial driving means 28 connecting the driven members for relative axial movement of the driven members in response to relative rotation of these members and through a distance which is proportional to the number of relative revolutions of the driving members. In the particular counter illustrated, the rotary driving means 26 comprise a speed reducing means 30, in this instance a so-called harmonic gear drive, for effecting relative rotation of the driven members 22, 24 at a substantially slower relative angular velocity than that of the driving members 16, 18. The axial driving means 28 comprise motion reducing and translating means, in this instance mating threads on the driven members, for imparting relatively small relative axial travel to the driven members in response to a relatively large number of relative revolutions of these members. As will appear from the ensuing description, the mating threads on the driven members 22, 24, which comprise the motion translating means 28 are selectively engageable to activate the counting function of the revolution counter 14 and disgageable to inactivate this counting function. Revolution counter 14 includes means 32 for effecting selective engagement of the mating threads on the driven members and thereby selectively activating and inactivating the counting function of the revolution counter.

In the particular application of the revolution counter 14 illustrated in FIGURES 1 through 7, the driving member 18 is relatively movable and forms one front wheel of the shopping cart 10. To this end, the driving member or wheel 18 mounts a rubber tire 34. The driving member 16 is relatively stationary and forms a support for the wheel 18. This stationary driving member or wheel support is provided with means 36 for attaching the support to the frame of the shopping cart 10. In this instance, the attachment means 36 comprises a normally vertically swivel shaft which extends normal to the rotation axis of the wheel 18 and is rotatably supported in a suitable bearing (not shown) within the shopping cart frame in such a way that the wheel assembly 12 functions as a front supporting caster for the cart.

According to the application of the invention under consideration, the revolution counter 14 embodied in the front wheel or caster assembly 12 is utilized to lock the caster wheel 18 against rotation in response to predetermined travel of the market basket 10 along the ground. To this end, the wheel assembly is equipped with brake means 38 which are activated by predetermined relative axial travel of the driven members 22, 24 in response to a predetermined number of revolutions of the wheel 18 and hence a predetermined travel of the market basket 10 along the ground.

Referring now in greater detail to the inventive embodiment under consideration, the driving member 16 comprises a supporting yoke for the wheel 18. This supporting yoke includes a pair of generally parallel side plates or arms 40 and 42 which are rigidly joined at their upper ends by a cross member 44. The swivel shaft 36 extends upwardly from the center of the cross member 44. Integrally formed on the outer side of the yoke arm 40 in centered relation to the rotation axis 20, is a tapered boss 46. Extending into the upper end of the boss, on the axis 20, is a square socket 48. A square opening 50 extends through the bottom wall of the socket on the axis 20. Extending into the upper wall of the socket 48, on an axis parallel to the upper inclined face of the boss 46, is a bore containing a spring loaded ball detent 52. This ball detent is urged, by its spring 54, to its normal position of FIGURE 2, wherein the ball protrudes into the socket 48. Extending inwardly from the inner side of the opposite yoke arm 42, in coaxial relation to the rotation axis 20, is a cylindrical inner hub 56. This inner hub has an open end adjacent but spaced a small distance from the inner side of the yoke arm 40. The outer cylindrical surface 58 of the hub 56 forms a cylindrical bearing surface. Formed in the inner surface of the hub 56, adjacent the open end of the hub, are a number of gear teeth 60. The toothed end of the hub 56, therefore, forms, in effect, an internal ring gear.

The driven member 22 of the revolution counter 14 comprises an internally threaded sleeve 62 which is coaxially disposed within the inner hub 56 and is integrally formed, at the end of the sleeve adjacent the yoke arm 42, with an outwardly directed circular flange 64. Integral with and extending axially from the outer face of the flange 64 is a cylindrical stub shaft 66 which is journaled in a bearing bore 68 extending into the inner face of the yoke arm 42 on the rotation axis 20.

Coaxially disposed between the driven member 22 and the inner hub 56 is a flex gear 70 including a cylindrical, resiliently yieldable sleeve body 72. The end of the flex gear body 72 adjacent the flange 64 of the driven member 22 surrounds this flange and is secured to the flange by screws 76. The inner surface of the hub 56 is circumferentially relieved in the plane of the flange 64 to provide clearance for the heads of the screws 76. The opposite end of the cylindrical flex gear body 72 is open and substantially flush with the adjacent end of the inner hub 56. Integrally formed on the outer surface of the flex gear body 72, adjacent its open end, are gear teeth 78 which are caused to mesh, in the manner hereinafter explained, with the internal gear teeth 60 on the hub 56. As will appear from the ensuing description, the hub 56 with its gear teeth 60 and the flex gear 70 with its gear teeth 78 together constitute the speed reducing means 30 referred to earlier.

The means 32 for selectively activating and inactivating the counting function of the revolution counter 14 comprise an actuation plunger 80 having a square head 82 which slides within the socket 48 in the yoke arm 40. Extending centrally from the inner face of the head 82, through the square opening 50 in the yoke arm 40, is a square shank 84 which is dimensioned to slide within the opening. Mounted in this square shank, inwardly of the yoke arm 40, is a roll pin 86 which prevents the actuation plunger 82 from being pulled free of the yoke arm 40. Mounted on the plunger shank 84, between the yoke arm 40 and the adjacent end of the sleeve 62 of the driven member 22, is a bearing 88. This bearing serves to rotatably support an outer hub 90 which carries the wheel tire 34.

Outer hub 90 has a cylindrical wall 92 which coaxially surrounds the inner hub 56 in radially spaced relation thereto. The end of the outer hub 90 adjacent the yoke arm 40 is closed by an integral end wall 94 which is centrally bored to receive the hub bearing 88. The end of the outer hub 90 adjacent the yoke arm 42 is open and is disposed in close surrounding relation to a coaxial cylindrical shoulder 96 on the inner side of the yoke arm 42. Disposed between the inner hub 56 and the cylindrical wall 92 of the outer hub 90 is a roller bearing unit 98 including cylindrical bearing rollers 100 joined at their ends by bearing rings 102. The bearing rollers 100 ride on the outer bearing surface 58 of the inner hub 56 and an inner bearing surface 104 of the outer hub 90 to rotatably support the outer hub on the inner hub. The wheel tire 34 surrounds the cylindrical wall 92 of the outer hub 90, in centered relation between the wheel suporting yoke arms 40, 42, and is secured to the outer hub in any convenient way.

Extending into the inner face of the end wall 94 of the outer hub 90 is a circular bearing socket 106 which journals the adjacent, open end of the sleeve 62 of the driven member 22. A pair of diametrically opposed stub shafts 108 are fixed to and extend inwardly from the outer hub end wall 94 in the region between the driven member 22 and the flex gear 70. These stub shafts mount roller bearing units 110, the outer races of which bear against the inner surface of the flex gear body 72, opposite the external gear teeth 78 on this body. As may be best observed in FIGURE 3, the bearing units 110 serve to deflect the flex gear body 72 outwardly, in the regions directly oposite the bearing units, to retain the flex gear teeth 78 within these regions in meshing engagement with the inner hub gear teeth 60. The flex gear body 72 is so dimensioned that the remaining flex gear teeth 78 are retained out of meshing engagement with the inner hub gear teeth 60. It will be understood that the flex gear body 72 is sufficiently flexible to enable the flex gear teeth 78 to be retained, by the bearings 110, in meshing engagement with the inner hub teeth 60, in the manner just explained.

It will be recalled that the axial driving means 28 comprise coacting, selectively engageable and disengagable motion translating means on the driven members 22, 24 for imparting relative axial movement to these members in response to relative rotation of the same and that the motion translating means, in the present instance, are mating threads on the driven members. Thus, the motion translating means 28 comprise the internal threads 112 within the sleeve 62 of the driven member 22 and external threads 114 on the driven member 24. It will further be recalled that the revolution counter 14 of the wheel assembly 12 comprises means 32, including an actuation plunger 80, for selectively activating and inactivating the motion translating means 28 by selective engagement and disengagement of the later means, that is by selective engagement and disengagement of the mating threads 112, 114 on the driven members 22, 24. To this end, the driven member 24 has an enlarged cylindrical end 116 externally formed with the threads 114 and an opposite reduced diameter end or hub 18. This hub extends toward and into an enlarged coaxial bore 120 in the flange 64 of the driven member 22. Press fitted or otherwise coaxially fixed at one end in the bearing hub 66 of the driven member 22 is a cylindrical bearing shaft 122. The opposite end of this shaft extends slidably through a central bore 124 in the driven member 24 and is slidably received in an axial socket 126 within an opening through the adjacent end of the square actuation plunger shank 84. The end of the bore 124 in the driven member 24 adjacent the hub 118 of the driven member is counterbored at 128 to provide the hub with a relatively thin wall, as shown. Extending axially into the end of the driven member 24 adjacent the actuation plunger 80 are a number of uniformly spaced slits 130 which terminate just short of the distal, hub end of the driven member and divide the enlarged externally threaded end of this member into a number of radially yieldable segments 116a. The end of the bore 124 in the driven member 24 adjacent the actuation plunger 80 is countersunk to define a conical recess 132 at this end of the bore. The adjacent end of the actuation plunger shank 84 is tapered to provide the shank with a conical tip 134.

Figure 4:
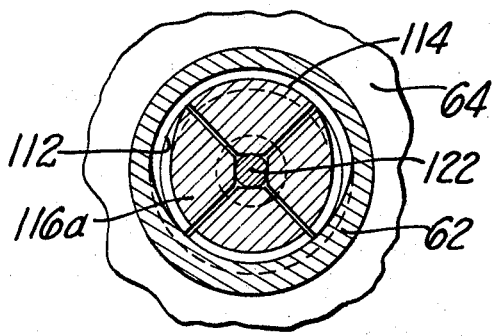
FIGURE 4 is a section taken on line 4—4 in FIGURE 2.
Figure 3:
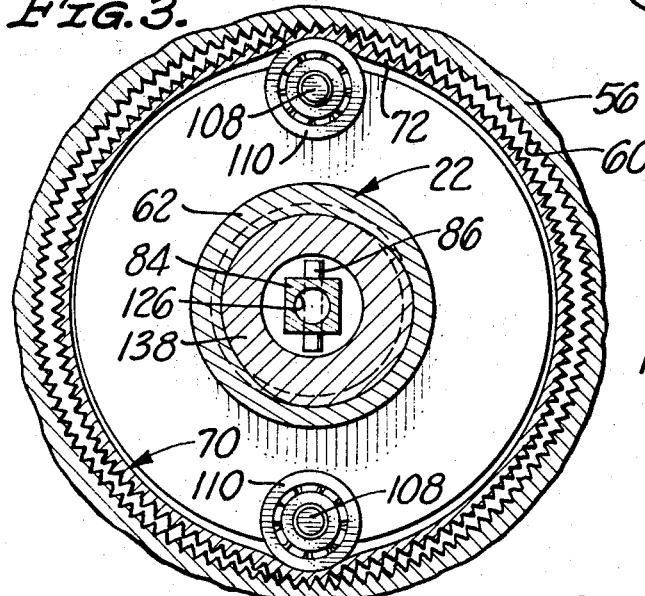
FIGURE 3 is a section taken on line 3—3 in FIGURE 2.
Figure 6:
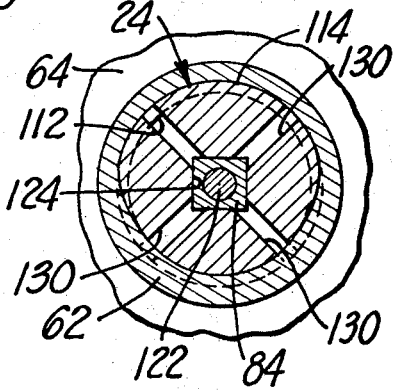
FIGURE 6 is a section taken on line 6—6 in FIGURE 5.
Figure 2:
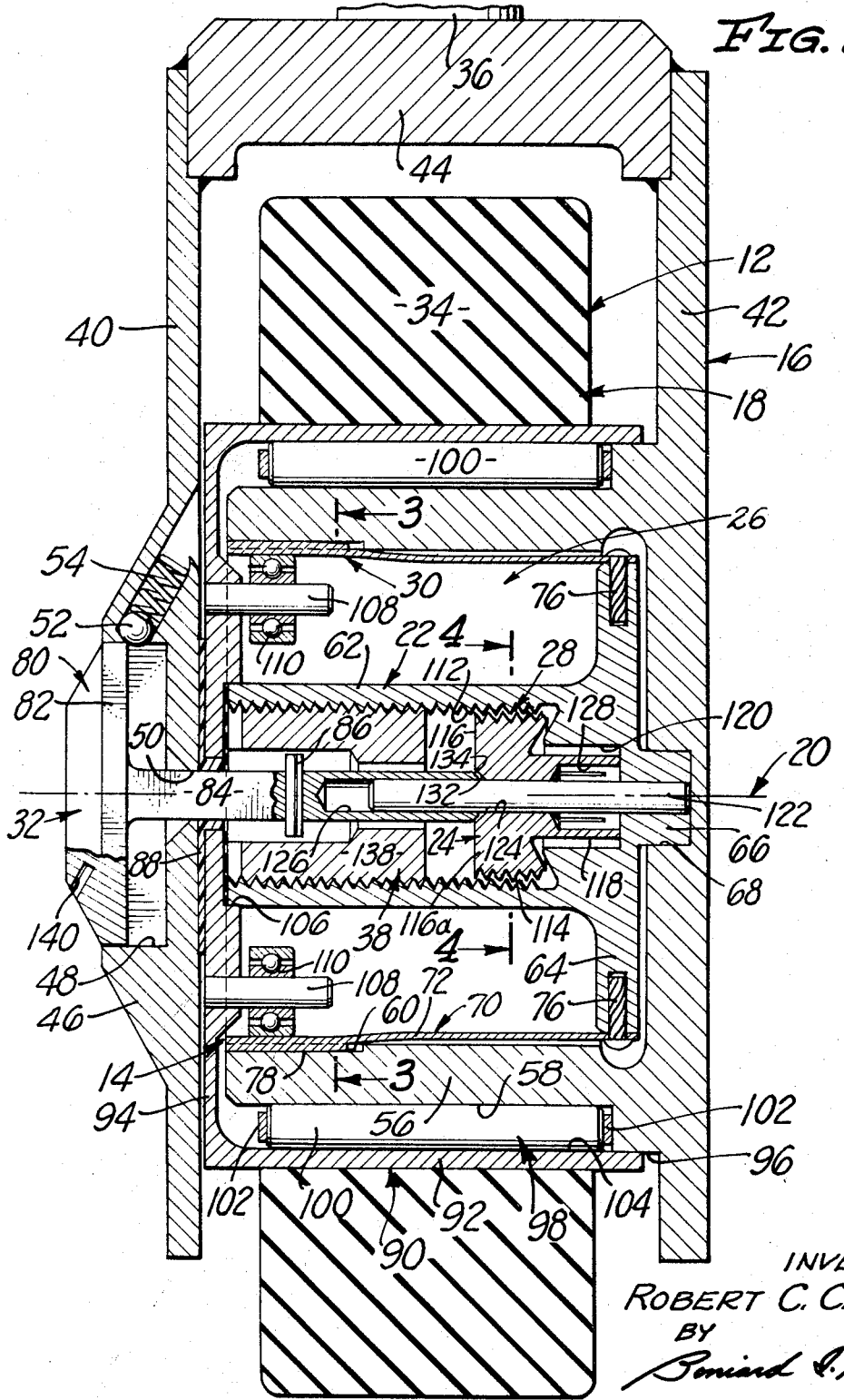
FIGURE 2 is an enlarged section taken on line 2—2 in FIGURE 1 and illustrating the parts of the brake in the positions which they occupy when the brake is inactivated against automatic operation.
Figure 2:

The driven member 24 is stressed in such a way that the inherent resiliency of this member normally retains its resiliently yieldable segments 116a in their radially inner contracted positions of FIGURES 2 and 4. In this contracted condition of the driven member 24, the external threads 114 on this member and the internal threads 112 on the driven member 22 are disengaged. Under these conditions, then, the rotary driving or motion translating means 28 are inactivated and the driven members are free to rotate relative to one another without affecting relative axial movement of these members. The driven member 24 assumes its contracted condition when the actuation plunger 80 occupies its outer retracted position of FIGURE 2, wherein the conical tip 134 of the plunger is disengaged from the driven member, as shown. Assume now that the actuation plunger is forced inwardly to its inner extended position of FIGURES 5 and 6. This inward extension of the plunger initially engages the conical tip 134 of the plunger with the conical wall of the recess 132 in the driven member 24 to cam the yieldable sectors 116a of the latter driven member radially outward to their expanded positions of FIGURES 5 and 6, wherein the mating threads 112, 114 on the driven members 22, 24 engage. Continued inward extension of the actuation plunger 80 to its fully extended position of the latter figures results in engagement of the square shank 84 of the plunger in the bore 124 of the driven member 24 in such a way that the corner edges of the shank engage in the slits 130 in the driven member to key the actuation plunger and the driven member against relative rotation. Inward extension of the actuation plunger 80, then, activates the axial driving or motion translating means 28 to operatively connect the driven members 22, 24 in such a way that relative rotation of these members is effective to cause relative axial translation of the members.

It will be recalled that the rotary driving means 30 forms a speed reducing, so-called harmonic gear drive which is effective to cause relative rotation of the driven members 22, 24 in response to relative rotation of the driving members 16, 18 at a relative angular velocity which is substantially less than that of the driving members. In the particular wheel assembly 12 illustrated, the harmonic gear drive 30 is effective to cause relative rotation of the driven members at a reduced speed in response to rotation of the driving member or cart wheel 18 relative to the driving member or wheel supporting yoke 16. To this end, the gear teeth 60 on the inner hub 56 and the gear teeth 78 on the flex gear 70 are relatively large in number and differ in number on the order of one to a few. In a typical revolution counter and wheel assembly according to the invention, for example, the inner hub 56 contains one hundred sixty-two gear teeth 60 and the flex gear 70 contains one hundred sixty gear teeth 78. Assume now that the driving member or cart wheel 18 is driven in rotation relative to the driving member or wheel supporting yoke 16. This rotation of the wheel 18 drives the outer hub 92 in rotation and thereby causes the outer races of the ball bearing units 110 to roll around the inner surface of the flex gear body 72. This rolling movement of the bearing units around the inner surface of the flex gear body causes the two zones or regions within which the inner hub and flex gear teeth 60, 78 are retained in meshing engagement by the bearing units to progress or rotate about the inner hub 56, which remains stationary. Because of the difference in the number of the gear teeth 60 and 78, this progression of rotation of the regions of meshing engagement of the gear teeth imparts to the flex gear 70, and hence to the driven member 22, a driving torque in one direction or the other depending upon whether the number of gear teeth 78 on the flex gear is greater or less than the number of gear teeth 60 on the stationary hub 56. The driving torque thus exerted on the inner driven member 22 rotates this member at an angular velocity which is substantially less than the angular velocity of the cart wheel 18 and is determined by the effective speed reduction ratio of the harmonic gear drive 30. This reduction ratio, in turn, is dependent upon the number and the difference in number of the gear teeth 60, 78. Assuming the numbers of gear teeth mentioned earlier, for example, the harmonic gear drive 30 has a reduction ratio of 80 to 1 and is effective to cause rotation of the driven member 22 through one revolution in response to each eighty revolutions of the cart wheel 18, in a direction opposite to the direction of rotation of the wheel. Recalling that the actuation plunger 80 is keyed against rotation relative to the wheel supporting yoke 16, by virtue of the complementary square shapes of the plunger head 82 and the socket 48 in which this head engages, and of the plunger shank 84 and the yoke arm opening 50 through which the shank extends, and further that the actuation plunger, when extended, is keyed against rotation relative to the driven member 24, by virtue of engagement of the corner edges of the plunger shank 84 in the slits 130 of the driven member, and retains the mating threads 112, 114 on the driven members 22, 24 in meshing engagement, it is evident that rotation of the cart wheel 18, with the actuation plunger extended, is effective to cause relative rotation and hence relative axial movement of the driven members. According to the present invention, the mating threads 112, 114 on the driven members are cut in such a way that rotation of the cart wheel 18 relative to the wheel supporting yoke 16 in the direction in which the wheel rotates when the shopping cart 10 is pushed forwardly along the ground, causes left hand travel of the driven member 24, as the wheel assembly 12 is viewed in FIGURE 2.

The wheel assembly 12 will be recalled to embody brake means 38 actuated by relative axial movement of the driven members 22, 24 for locking the cart wheel 18 against rotation relative to the wheel supporting yokes 16. These brake means comprise the driven member 24 and a brake plug 138 which is threaded within the outer end of the sleeve 62 on the driven member 22. It is evident from the earlier description that forward rotation of the cart wheel 18, that is rotation of the wheel in the direction in which the wheel rotates during forward movement of shopping cart 10 along the ground, results in axial movement of the driven member 24 toward and finally into contact with the brake plug 138. This engagement of the driven member 24 with the brake plug 138 obviously locks the latter driven member and the driven member 22 against relative rotation and, thereby, locks the cart wheel 18 against rotation relative to the wheel supporting yoke 16. Assuming that the driven member 24 initially occupies its left hand limiting position of FIGURE 2, the number of revolutions of the wheel 18 required to effect engagement of the latter driven member with the brake plug 138, and hence the number of revolutions through which the wheel may rotate and the forward distance through which the shopping cart 10 may be pushed before the brake is applied to lock the wheel against rotation, are determined by the axial position of the brake plug relative to the driven member 22. It is further evident that the number of revolutions through which the wheel may rotate, and hence the forward distance through which the shopping cart may be pushed, before application of the brake, may be adjusted by rotating the brake plug 138 relative to the driven member 22 to adjust the axial position of the plug relative to the driven member. In a typical shopping cart wheel assembly 12 according to the invention, the cart wheel 18, when loaded and in motion, has a linear travel of approximately sixteen inches for each revolution, and eighty revolutions of the wheel effects axial travel of the driven member 24 toward the brake plug 138 a distance equal to the pitch of the mating threads 112, 114 on the driven members 22, 24. Thus, the linear travel of the wheel 18 required to advance the driven member 24 toward the brake plug 138 a distance equal to the thread pitch is approximately one hundred six feet.

Figure 5:
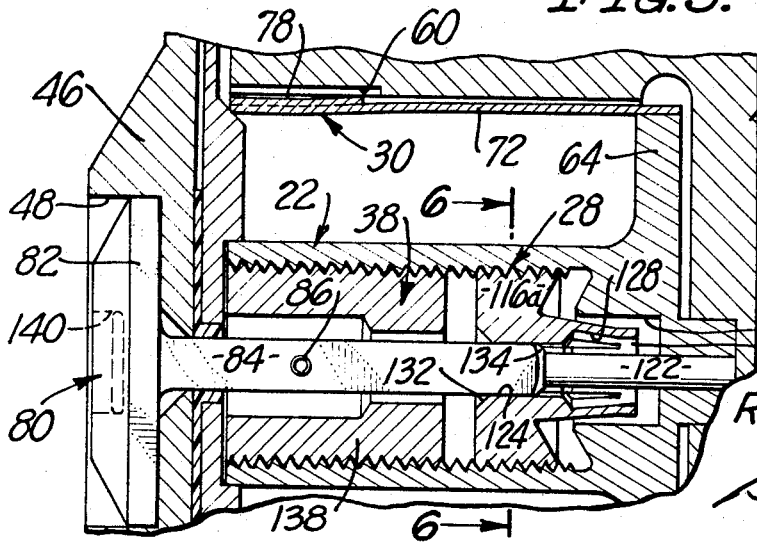
FIGURE 5 is a fragmentary section similar to FIGURE 2 illustrating certain parts of the brake in the positions which they occupy when the brake is conditioned for automatic operation.
Figure 7:
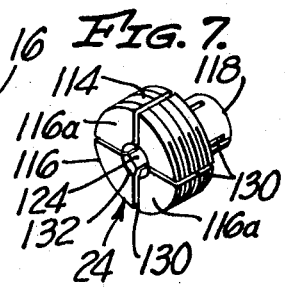
FIGURE 7 is a detail, in reduced perspective, of on element of the wheel brake.

The wheel 18 is released for rotation, after application of the brake means 38, by retracting the actuation plunger 80 to its outer limiting position of FIGURE 2. In this retracted position of the plunger, the plunger shank 84 is retracted from the driven member 24, thus permitting this member to assume its contracted condition of FIGURE 2, wherein the threads 112, 114 on the driven members 22, 24 are disengaged to permit free rotation of the driven members and hence free rotation of the wheel 18. In the particular application of the invention under discussion, it is desirable to permit the brake means 38 to be released only by authorized persons. The ball detent 52 is provided for this reason. Thus, inward extension of the actuation plunger 80 to its engaged position of FIGURES 5 and 6 results in inward projection of the ball detent 52, by its spring 54, across the outer side of the plunger head 82, as shown in FIGURE 5, thus to lock the plunger in its engaged position. To permit outward retraction of the plunger to its disengaged position of FIGURE 2, the plunger head 82 is provided with a key slot 140 of some uncommon shape, such as an S-shape, which is designed to receive a complementary shaped tool in the position of an authorized person, by which an outward retracting force may be exerted on the plunger for pulling the plunger to its retracted position. In this regard, it is a significant to note that the outer beveled face of the plunger head 82 cams the ball detent 52 to its retracted position, wherein the ball clears the plunger head to permit retraction of the plunger.

The operation of the wheel assembly 12 and its contained revolution counter 14 is believed to be obvious from the preceding description. Thus, assuming that the actuation plunger 80 occupies its outer retracted or disengaged position of FIGURE 2, the driven member 24 is released to assume its contracted condition of that figure, wherein the mating threads 112, 114 on the driven members 22, 24 are disengaged. The wheel 18 is then capable of unrestricted rotation, and the shopping cart 10 is capable of unlimited movement, without imparting axial travel to the driven member 24 and hence applying the brake means 38. The brake means 38 are conditioned for automatic application in response to predetermined forward movement of the cart 10, determined by the setting of the brake plug 138, by extending the actuation plunger 80 inwardly to its extended or engaged position of FIGURES 5 and 6, as by pushing on the plunger head 82 with the toe of the foot. This inward extension of the plunger initially drives the driven member 24 axially to its right hand limiting position of FIGURE 2 and thereafter expands the threads 114 on this driven member outwardly to mating engagement with the threads 112 in the driven member 22 and simultaneously keys the driven member 24 against rotation with the driven member 22. The actuation plunger 80 is locked in its extended, engaged position by the ball detent 52. Forward movement of the shopping cart 10 now effects axial movement of the driven member 24 toward the brake plug 138 to effect automatic application of the brake means 38, and thereby locking of the cart wheel 18 against forward movement, in response to forward movement of the shopping cart 10 through the predetermined distance determined by the setting of the brake plug 138.

It is obvious at this point that the mechanism 14 of the invention may be regarded, broadly, as a revolution counter which may be utilized for purposes other than automatic braking of a shopping cart wheel. In this regard, it is significant to note that the members 16, 18 of the mechanism are mutually supported for relative rotation on the axis 20, whereby either member may rotate relative to the other member. In addition, the members 16, 18 and the members 22, 24 are, broadly speaking, driving and driven members, respectively, in the sense that rotation of the member 18 relative to the member 16 drives the member 22 in rotation relative to the member 24, and rotation of the member 16 relative to the member 18 drives the member 24 in rotation relative to the member 22. It is further significant to note that the relative axial travel of the driven members 22, 24, occasioned by relative rotation of the driving members 16, 18, when the actuation plunger 80 occupies its extended engaged position, is proportional to the number of relative revolutions of the driving members. That is to say, any given incremental relative axial travel of the driven members 22, 24 corresponds to a predetermined number of relative revolutions of the driving members 16, 18. Thus, the relative axial travel of the driven members provides, broadly speaking, a revolution counting function which may be utilized in various ways. For example, in the shopping cart application described earlier, this counting function is employed, in effect, as a digital counting function which indicates, by arresting of the driving member 18, a preset number of revolutions of this driving member relative to the driving member 16. The revolution counter 14 may be modified to effect an analog counting function by providing the mechanism with means for continuously indicating the relative axial positions of the driven members 22, 24 in terms of the relative revolutions of the driving members 16, 18. It is also significant to note that the linear closing speed of the driven members 22, 24, that is the linear velocity at which these driven members approach one another during relative rotation of the driving members 16, 18, is proportional to the relative angular velocity of the driving members. Thus, the mechanism 14 may conceivably be employed to measure the angular velocity of the driving members by providing the mechanism with means for sensing the linear closing speed of the driven members.

Figure 8:
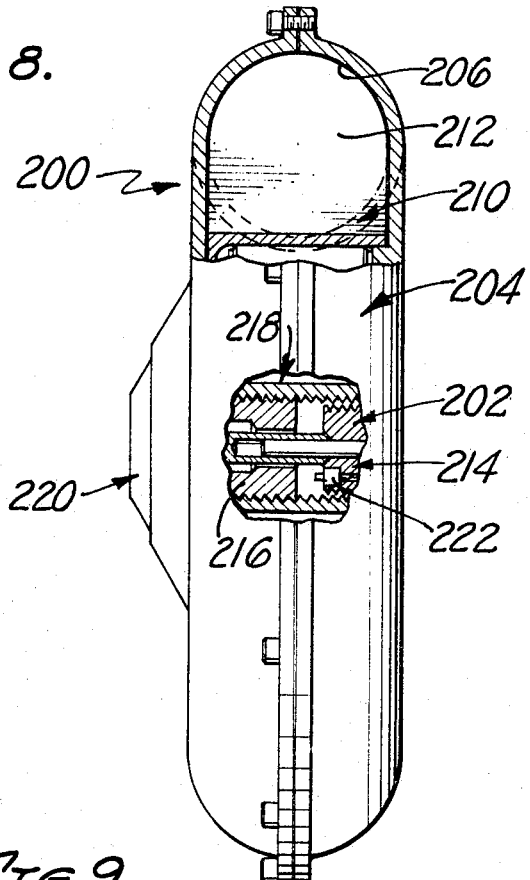
FIGURE 8 is a side elevational view, partially in section of a fluid flow meter or sensor which embodies the revolution counter of the invention.
Figure 9:
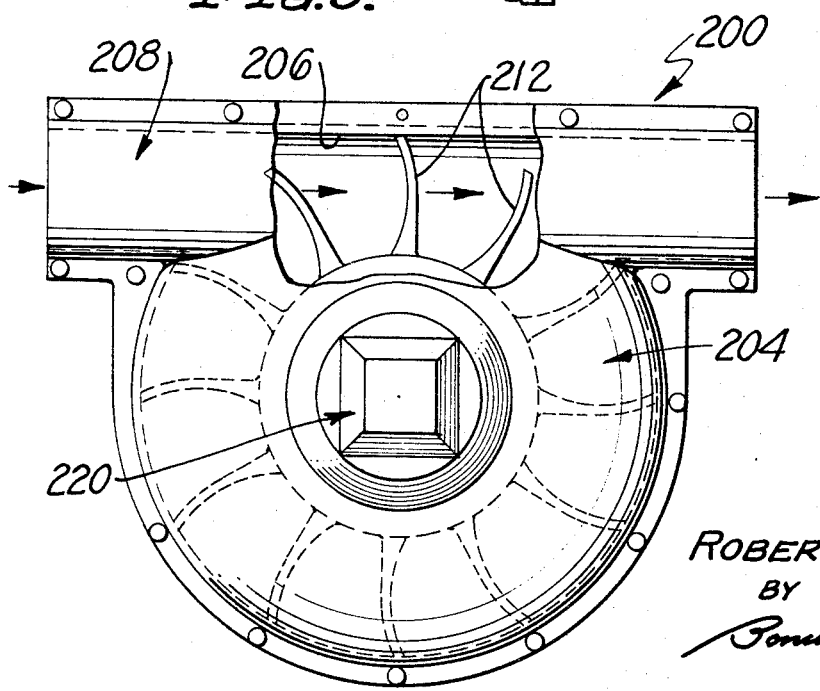
FIGURE 9 is a front elevational view, partially in section, of the fluid flow sensor or metering device of FIGURE 8.

By way of illustrating an alternative use of the mechanism or revolution counter 14, reference is made to FIGURES 8 and 9 which illustrate a fluid flow meter 200 embodying a revolution counter 202 according to the invention. Counter 202 is essentially identical to the revolution counter 14 illustrated in FIGURES 1 through 7 and differs from the latter counter only in the following respects. The outer driving member 204 of the counter 202, which corresponds to the driving member 16 of the counter 14, comprises a sealed housing opening at one side to the fluid passage 206 within a fluid conduit 208. The inner driving member 210 of the counter 202, which corresponds to the inner driving member 18 of the counter 14, comprises an impulse wheel or rotor having radial vanes 212 which rotate through the fluid passage 206 in such a way that fluid flowing through the passage acts on the vanes to drive the rotor in rotation. Rotation of the rotor by the fluid occurs in the direction to cause axial movement of the driven member 214 toward the plug 216 of the driven member 218, corresponding, respectively, to the driven member 24, brake plug 138, and driven member 22, of the counter 14, when the actuation plunger 220 of the counter 202, corresponding to the actuation plunger 80 of the counter 14, is extended to its engaged position. Driven member 214 mounts an electrical switch 222, such as a microswitch, which is disposed for engagement with and actuation by the plug 216 upon relative axial movement of the driven member 214 and plug 216 toward one another. Switch 222 may operate a digital flow indicator, a valve in the fluid conduit 208, or other control device. The revolution counter 202 of the flow meter 200 is otherwise identical to the earlier revolution counter 14.

It is evident, therefore, that if the driven member 214 is initially set in a position corresponding to that of the driven member 24 in FIGURE 2 and the actuation plunger 220 is extended to its engaged position, fluid flow through the conduit 208 causes axial travel of the driven member 214 toward the plug 216 through a distance which is proportional to the volumetric flow rate of the fluid in the conduit and at a velocity proportional to the flow velocity. Thus, the plug 216 may be set to actuate the switch 214 in response to a predetermined flow volume through the conduit. Flow velocity may be monitored by sensing the closing rate of the driven member 214 and plug 216. As before, the counter 202 may be inactivated to permit unrestricted rotation of the rotor 210, by retracting the actuation plunger 220 to its disengaged position.

Those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A revolution counter comprising:
a pair of rotary driving members mutually supported for relative rotation on an axis,
a pair of driven members supported by said driving members for relative rotation on and relative axial movement along said rotation axis,
rotary driving means connecting said driven members to said driving members, respectively, for effecting relative rotation of said driven members upon relative rotation of said driving members,
axial driving means connecting said driven members for effecting relative axial movement of said driven members in response to relative rotation of said driving members and through a distance proportional to the number of relative revolutions of said driving members, and
said axial driving means comprising coacting motion translating means on said driven members which are selectively engageable to effect proportional relative axial movement of said driven members in response to relative rotation of said driving members and disengageable to permit relative rotation of said driven members without relative axial movement of said driven members, and means for selectively engaging and disengaging said motion translating means.

2. A ground wheel assembly for a market shopping cart comprising:
a pair of rotary driving members mutually supported for relative rotation on an axis,
a pair of driven members supported by said driving members for relative rotation on and relative axial movement along said rotation axis,
rotary driving means connecting said driven members to said driving members, respectively, for effecting relative rotation of said driven members upon relative rotation of said driving members,
axial driving means connecting said driven members for effecting relative axial movement of said driven members in response to relative rotation of said driving members and through a distance proportional to the number of relative revolutions of said driving members,
one of said driving members comprising a ground wheel,
the other driving member comprising a wheel support having means for attachment to said cart,
said axial driving means comprising coacting motion translating means on said driven members which are selectively engageable to effect proportional relative axial movement of said driven members in response to rotation of said wheel relative to said wheel support and disengageable to permit rotation of said wheel relative to said wheel support without relative axial movement of said driven members, and means for selectively engaging and disengaging said motion translating means, and
coacting brake means on said driven members for locking said wheel against rotation relative to said wheel support in response to relative axial movement of said driven members to drive in braking positions.

3. A revolution counter comprising:
a pair of rotary driving members mutually supported for relative rotation on axis,
a pair of driven members supported by said driving members for relative rotation on and relative axial movement along said rotation axis,
rotary driving means connecting said driven members to said driving members, respectively, for effecting relative rotation of said driven members upon relative rotation of said driving members,
axial driving means connecting said driven members for effecting relative axial movement of said driven members in response to relative rotation of said driving members and through a distance proportional to the number of relative revolutions of said driving members, one of said driven members comprising an external driven member including an internally threaded sleeve coaxially disposed relative to said axis, the other driven member comprising an internal, axially slit, radially yieldable driven member coaxially disposed within said sleeve and having external threads adapted to mate with the internal threads on said sleeve, said internal driven member being normally contracted to disengage the mating threads on said driven members, thereby to permit relative rotation of said driven members without relative axial movement of said driven members, and said internal driven member being radially expandable to engage said mating threads, thereby to effect relative axial movement of said driven members in response to relative rotation of said driven members, actuating means for effecting selective expansion and contraction of said internal driven member and, thereby, selective engagement and disengagement of said mating threads, one driving member comprising a cylindrical hub coaxially surrounding said external driven member and having internal gear teeth, said rotary driving means comprising a cylindrical, radially yieldable flex gear coaxially disposed between said external driven member and said hub and having external gear teeth adapted to mesh with said internal gear teeth, means securing said flex gear to said external driven member for rotation thereof in unison, the other driving member comprising means for deflecting said flex gear outwardly to establish mating engagement of said internal and external gear teeth within two diametrically opposed regions of mating engagement, and said driving members being rotatable on said axis to cause rotary progression of said regions of mating engagement about said axis, and the number of internal gear teeth being different than the number of external gear teeth such that relative rotation of said driving members effects relative rotation of said driven members at an angular velocity substantially less than the angular velocity of said driving members.

4. A revolution counter according to claim 3 wherein:
said actuation means comprise an actuation plunger keyed against rotation relative to said one driving member and coaxially supported on the latter driving member for movement along said rotation axis between extended and retracted positions, said plunger having a polygonal shank engageable in a central opening in said internal driven member for keying said internal driven member against rotation and expanding said internal driven member to engage said mating threads upon movement of said plunger to said extended position, and said shank being retracted out of engagement with said internal driven member to release said internal driven member for contraction to disengage said mating threads by movement of said plunger to said retracted position.

5. A revolution counter according to claim 4 wherein:
said counter comprises a ground wheel assembly for market shopping carts and the like,
said other driving member comprises a ground wheel,
said one driving member comprises a wheel support having means for attachment to said cart,
said plunger is accessible externally of said wheel support for selective extension and retraction of said plunger by authorized persons, and
means for releaseably locking said plunger in its extended position to prevent retraction of said plunger by unauthorized persons.

6. A revolution counter according to claim 5 wherein:
said brake means include means for adjusting the number of revolutions of said wheel relative to said wheel support required to engage said brake means.

7. A revolution counter comprising:
a pair of rotary driving members mutually supported for relative rotation on an axis,
a pair of driven members supported by said driving members for relative rotation on and relative axial movement along said rotation axis,
rotary driving means connecting said driven members to said driving members, respectively, for effecting relative rotation of said driven members upon relative rotation of said driving members,
axial driving means connecting said driven members for effecting relative axial movement of said driven members in response to relative rotation of said driving members and through a distance proportional to the number of relative revolutions of said driving members,
one of said driven members having an initial position along said rotation axis and being movable in one direction along said axis in response to relative rotation of said driving members in one direction,
the other driven member including an adjustable member positioned on said axis in the path of said one driven member, whereby said latter driven member and adjustable member are movable into engagement by relative rotation of said driving members in said one direction, and
means for shifting the position of said adjustable member along said axis, thereby to adjust the number of relative revolutions of said driving members required for engagement of said adjustable member and said other driven member.

8. A revolution counter according to claim 7 wherein:
said axial driving means comprise coacting motion translating means on said driven members which are selectively engageable, to effect relative axial movement of said driven members in response to relative rotation of said driven members, and disengageable, to permit relative movement of said driven members without relative axial movement of said driven members and free axial movement of said other driven member relative to said one driven member, and
actuating means for effecting selective engagement and disengagement of said motion translating means and returning said other driven member to said initial position when said motion translating means are disengaged.

References Cited

UNITED STATES PATENTS

| | | | |
|---|---|---|---|
| 2,078,057 | 4/1937 | Chirca | 73—229 |
| 2,307,317 | 1/1943 | König | 74—424.8 |
| 2,481,129 | 9/1949 | Le Tourneau | 74—424.8 |
| 2,983,162 | 5/1961 | Musser | 74—640 |
| 3,091,979 | 6/1963 | Schaefer et al. | 74—640 |
| 3,214,991 | 11/1965 | Perrin | 74—424.8 |

FRED C. MATTERN, JR., *Primary Examiner.*

LEONARD H. GERIN, *Assistant Examiner.*